STORAGE AND RETRIEVAL SYSTEM

Filed April 18, 1968

4 Sheets-Sheet 1

INVENTORS
ARIADNE L. LOEWENTHAL
RUDOLF LOEWENTHAL
GARY M. FLYNN
BY Alexander & Dowell
ATTORNEYS INVENTORS
ARIADNE L. LOEWENTHAL
RUDOLF LOEWENTHAL
GARY M. FLYNN
BY Alexander & Dowell
ATTORNEYS INVENTORS
ARIADNE L. LOEWENTHAL
RUDOLF LOEWENTHAL
GARY M. FLYNN
BY Alexander & Dowell
ATTORNEYS Feb. 16, 1971 A. L. LOEWENTHAL ET AL 3,564,508

STORAGE AND RETRIEVAL SYSTEM

Filed April 18, 1968 4 Sheets-Sheet 4

INVENTORS
ARIADNE L. LOEWENTHAL
RUDOLF LOEWENTHAL
GARY M. FLYNN

BY *Alexander & Dowell*

ATTORNEYS

United States Patent Office 3,564,508
Patented Feb. 16, 1971

3,564,508

STORAGE AND RETRIEVAL SYSTEM

Ariadne L. Loewenthal and Rudolf Loewenthal, Rockville, and Gary M. Flynn, Bethesda, Md., assignors to Numo-Trans Data Corporation, a corporation of Maryland Filed Apr. 18, 1968, Ser. No. 722,240
Int. Cl. G06f *15/02, 15/40*
U.S. Cl. 340—172.5 17 Claims

ABSTRACT OF THE DISCLOSURE

A desk-top data storage and retrieval system into which descriptor terms and bibliographic data are entered by a keyboard, the latter being stored propinquitiously with tag numbers of fixed format automatically generated by the entry of descriptor terms. In the retrieval mode, the operator enters a descriptor term as an interrogation of the system, which then automatically generates the appropriate tag number and matches it against stored tag numbers, and reads out such bibliographic data as it finds stored together with identical tag numbers. The tag number which represents each word or phrase making up a descriptor term is generated by arbitrarily assigning numbers to all letters of the alphabet, arranging the series of assigned numbers representing a descriptor term according to a matrix of horizontal rows and then adding the resulting columns of numbers to form a tag number. Plural tag numbers each representing a simple concept can be selectively combined by addition to form another combined tag number representing a compound concept.

This invention relates to a novel data processing system especially adapted for use by persons working in a specialized limited field of effort, such as scientists, engineers, lawyers, etc., and more particularly relates to a desk-top unit of relatively small size and cost which is designed to expedite the storage and retrieval of data usually in the form of documents which can be identified by title, author, content, accession number, patent number, or by one of many other well-known means.

These documents contain information which can be described and identified by the personnel operating the present system using consistent terminology which is well understood so that the data to be processed in these documents can be stored and retrieved using such terminology as descriptor terms having specialized meaning to the skilled operating personnel, which terms need not be consistent with broader dictionary definitions. A large computer system can be operated to retrieve data by a person having only generalized knowledge of the stored subject matter, mainly because a large computer can be asked questions in a greater variety of ways because its information is stored by semantics. However, the present desk-top system is designed to have more utility to a group of people having specialized knowledge of the information stored therein, because the data processing is accomplished by tagging the data with precise descriptor words and phrases which the unit can recognize, although failing such recognition, it can give no response.

It is a major object of this invention to provide a compack desk-top unit having a keyboard by which an operator can enter natural-language words and phrases comprising the descriptors of data contained in certain documents, whose bibliographic identifications are also entered for storage by way of the same keyboard. The unit then stores these bibliographical identifications tagged with the specialized descriptor terms encoded in the form of a binary series of numbers. When it is desired to recover documents containing data represented by a particular descriptor term, the operator types the natural-language descriptor term into the keyboard, thereby initiating the same encoding translation process, without having to first consult a list of key terms and obtain therefrom preassigned tags of the type which are used to address many prior art data processing systems. The system responds to such interrogation by reading out the bibliographic identification of all such documents as are tagged with that descriptor term. The emphasis in the present case is upon simplicity of use by the operator who need only know the specialized descriptor terms under which the information is stored, and type these terms directly into the machine. Consistency of terms is a requirement for using the present system.

Therefore, assuming a specialized lexicon of descriptor terms with which a particular system is to perform its processing functions, such as storage and retrieval, it is necessary for the system to translate these descriptor terms, which are entered in the form of natural-language alphabetic words and phrases, into binary numbers which are recorded by the system as address tags for the stored documents. Since the storage is in binary form in most computer systems, this form will be adhered to. To be satisfactory, the ultimate document tag numbers must be of fixed format having a uniform record length; must identify each descriptor word or phrase uniquely, although arbitrarily; and must be reliably arrived at without the operator of the system having to use coding tables or dictionaries.

It is a major object of this invention to provide a keyboard-operated electronic system for translating descriptor words and phrases in a reliable and convenient manner into arbitrary tag numbers, which are then stored together with the bibliographic document identification data.

It is a further major object of the invention to provide a system for translating descriptor terms of varying lengths, i.e., number and length of words, into binary tag numbers of fixed record length which uniquely identify the descriptor words or phrases. In general, it is desirable to have a descriptor word or phase fairly lengthy, because its length adds to its uniqueness. The present invention includes a novel system for encoding such fixed-format tag numbers regardless of the length of the descriptor. In accomplishing this purpose, the descriptor word or phrase is considered merely as a series of alphabetic letters, ignoring punctuation marks, capitalization, etc., and in some embodiments ignoring the spacings between words so as to make a continuous sequence of the alphabetic symbols. For instance, in the simple embodiment discussed herein, each letter in the alphabet is assigned a single-digit number, 1 through 9, and since there are only nine such numbers but there are many more alphabetical symbols in the language, the same number must be used to identify several different symbols of the alphabet. It may be desirable to employ two or even three-digit numbers when dealing with a language having a very large number of symbols, for instance Chinese or Japanese.

There are of course an enormous number of different possible assignments of this type, but a table of exemplary assigned numbers which perform in a satisfactory manner in the English language is as follows:

| Numbers: | Alphabet symbols | | |
|---|---|---|---|
| 1 | A | J | S |
| 2 | B | K | T |
| 3 | C | L | U |
| 4 | D | M | V |
| 5 | E | N | W |
| 6 | F | O | X |
| 7 | G | P | Y |
| 8 | H | Q | Z |
| 9 | I | R | |

0 is used to fill unoccupied digital positions.

Using the above assignment of numbers to the letters of the alphabet, if the assigned numbers were simply substituted for the letters and strung out in a row according to the descriptor term sequence, the resulting number would be variable in format, and often quite lengthy, so that it could not be efficiently handled in a system of reasonable size. Therefore, the series of assigned numbers is divided into groups of selected length, such as groups of ten letters each, and these groups are arranged in horizontal rows, one-below-the-other, to form a rectangular matrix in which each series of ten assigned numbers forms a row. The numbers, thus vertically columnized, are then added in the customary way. Each time the sum of the numbers in a column exceeds nine, a number is carried to the next column to the left, with the result that when the matrix is added vertically it provides a ten, eleven, or twelve digit number across the bottom of the matrix. The number 0 is used to fill unused spaces in the matrix and to pad out all numbers to the standardized number of digits in the format, each such number comprising a numerical tag for stored information represented by the selected descriptor term. For the sake of ease of addition and consistency, if the lowermost horizontal row of assigned numbers does not fill the matrix, zeros are put in the empty matrix positions in the row adjacent to that number.

Incidentally, it is of interest to note that a common adding machine has been used to establish such tag numbers in the following way. Each of the keys 1 through 9 on a ten-key adding machine was provided with a paper tab pasted over the key and carrying the several symbols of the alphabet assigned to the number represented by that key, so that a #1 key, for instance included the letters A, J and S, and the tab covering a #7 key included for instance G, P and Y. Then the descriptor phrase was entered on the keyboard of the adding machine, ten consecutive letters at a time, such that the number representing the first letter was entered in the upper-right-hand corner of the resulting matrix on the paper tape of the adding machine, and the subsequent numbers representing assigned letters were strung out in a horizontal row to the left of it, up to ten digits. Parenthetically, if a ten-key adding machine is used, of course, the first entry is shifted to the left by the next succeeding entry, and so on, so that the ultimate number is reversed on the paper tape, which reversal is not significant so long as the selected sequence is consistently practiced throughout. Then the entry-bar of the adding machine was actuated. The second row of ten alphabetic symbols was entered from left to right to produce on the paper tape of the adding machine ten more numbers in a row columnated with the first ten numbers entered, and the process was repeated in like manner until the entire descriptor phrase had been entered in rows on the tape. When so entered, the total-bar of the machine was pressed, and the resulting total number at the bottom of the printed tape exactly indicated the desired tag number assigned to that descriptor phrase after filling in zeros to the left to pad the number out to the desired total number of digits in the selected format, if such padding was necessary.

Stil another object of the invention is to provide a system for increasing the uniqueness of tag numbers by operating upon each number with another number related to the number of words in the phrase represented by the tag number to reduce the possibility of two identical tag numbers representing different descriptor phrases.

It is another object of the invention to provide a system in which the various encoded tag numbers can be combined together to provide a new coded tag number representing the combined descriptor terms respectively represented by the combined simple tag numbers. That is to say, both simple terms and compound terms, once coded, are of identical format and therefore may be processed without discrimination. The inherent advantage of this method lies in its ability to compound index terms without compounding record length, without necessitating the institution of an individual search for each set of independent descriptors selected for combination, and without resorting to levels-of-significance selected and pre-referenced tables of permissible combinations. Since the simple descriptors are combined after encoding by ordinary addition, their sequence in alphabetic form is not important, and any sequence will result in the same combined tag number.

One natural-language descriptors are converted to tag numbers they must be stored in an auxiliary memory of the system so that they can be available for future combining. The need for memory arises from the fact that such compound descriptors cannot be formed by the combining of single descriptors until all of the single descriptors are encoded into numbers. In the present working example, the greatest number of descriptor terms for any one document is assumed to be five, so the system must be able to remember five tag numbers each consisting of twelve decimal digits. Furthermore, it must have the capability of recalling these words at some time in the future upon demand. When an operator has entered two simple terms into the system, and desires to use them to form a compound descriptor, they are combined by simple arithmetic addition, just as portions of individual terms were combined as set forth above. This results in a new and unique eleven or twelve digit compound number. A keyboard panel control system selects single descriptor tags for combination by recalling them from said auxiliary memory selectively. As the compound term is formed it may be transferred immediately for use as a storage tag number since no further processing of it is required. Furthermore, once all such compound terms are generated, the original coded descriptor terms may also be transferred to the main document storage, thereby clearing the processor's temporary storage capability.

As stated above, all information is entered into the present system in natural-language through the typewriter-like keyboard, and all such input information falls into one of two categories, namely a first category of information which requires no further processing on the part of the system and comprises simple through-put to be recorded in the storage medium, and a second category of information which does require further processing before it attains a useable form. The first category in general comprises bibliographic information, such as title, author, publisher, accession numbers, patent numbers, etc., all of which are merely stored for future retrieval. The second category of information comprises the natural-language descriptor terms which must be encoded into tag numbers having a useable multidigit binary format. The encoding has been described above, and will be further elaborated in connection with the drawings of this disclosure. The total information entered at the keyboard must be internally separated into those items requiring further processing and encoding, and through-put information which merely has to be converted into binary form for storage. It is an object of this invention to provide means by which the system can separately handle the above two categories of information.

In the desk-top embodiment of the present system, the unit performs the associating of all information at one address, namely bibliographic information together with the proper tags, and then enters this information upon a storage carrier such as a punched or magnetic tape, or other carrier which can be used for limited storage and retrieval. Such a tape can also be used in conjunction with external storage capacity, for instance of a computer, and when so used, the capability of the system can be extended beyond mere storage and retrieval to include more sophisticated functions such as cataloging, indexing, searching, etc. During retrieval, the stored information must be returned to the original form suitable for human use, and presented to the operator upon demand.

Other objects and advantages of the present invention will become apparent during the following discussion of the drawings, wherein.

Figure 1:
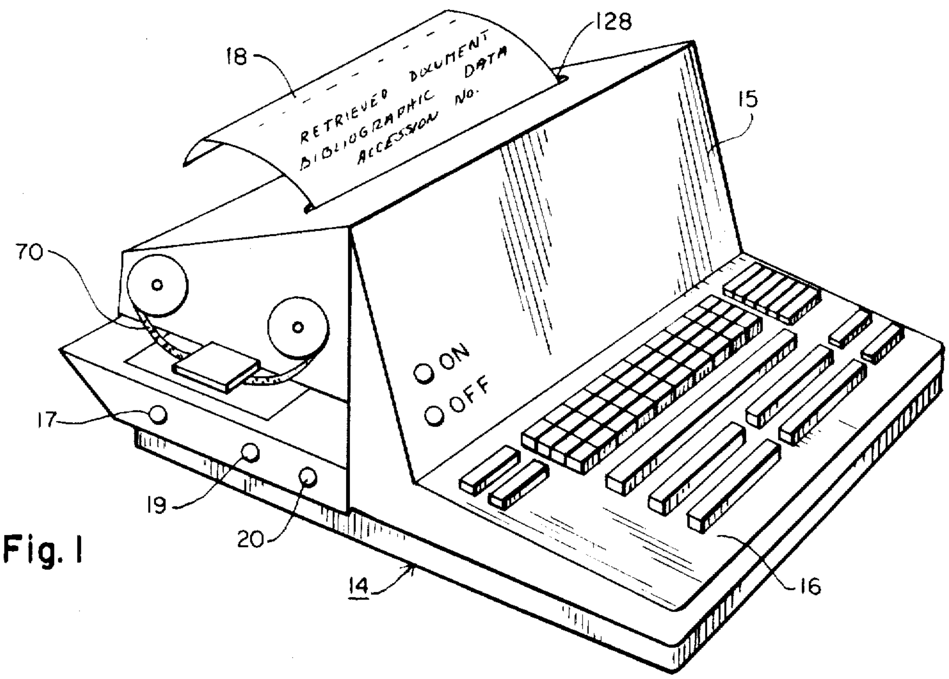
FIG. 1 is a perspective view of a desk-top embodiment of the present system.
Figure 4:
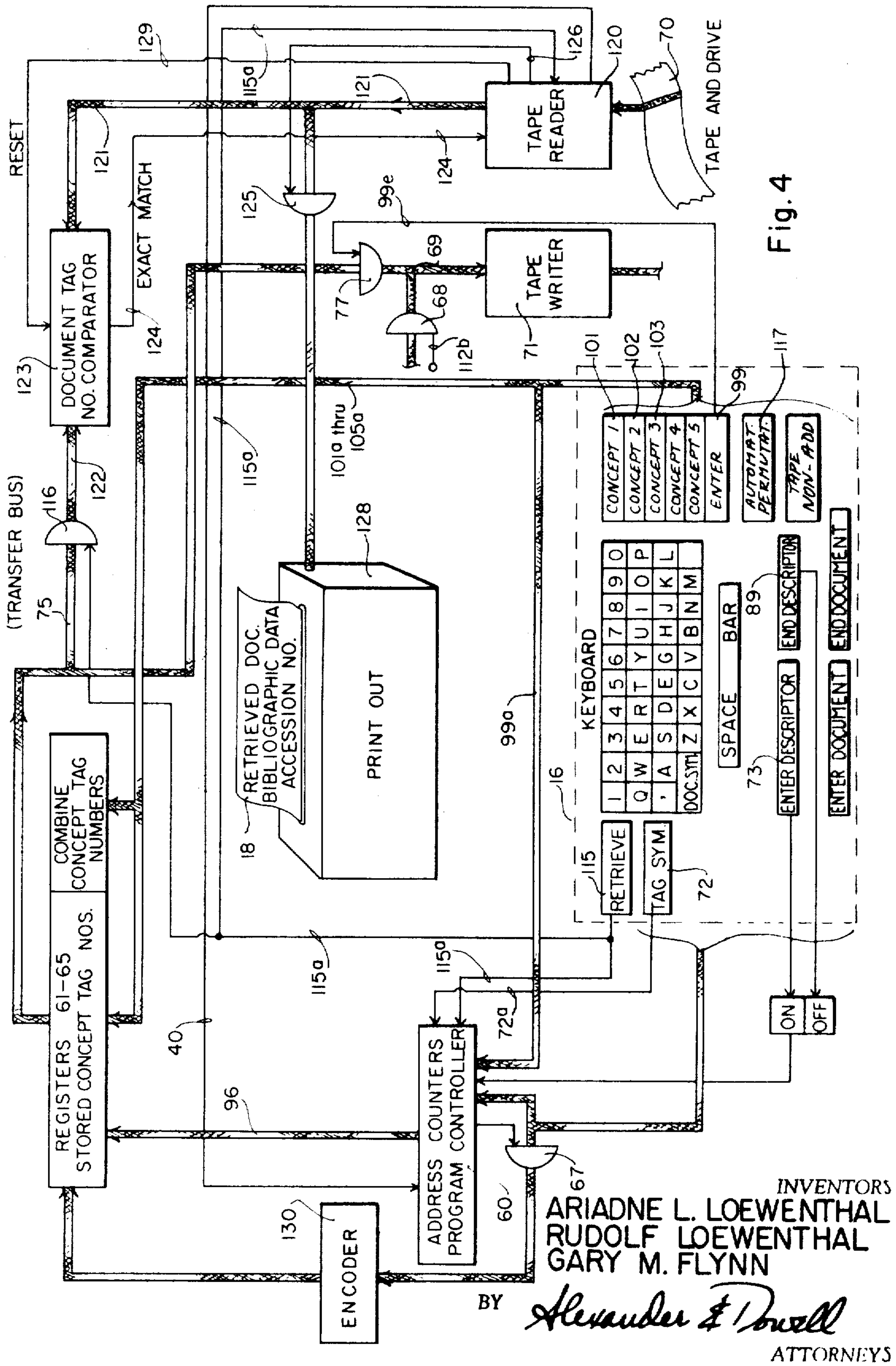
FIG. 4 is a block diagram showing in greater detail the data-retrieval mode of the system.
Figure 3:
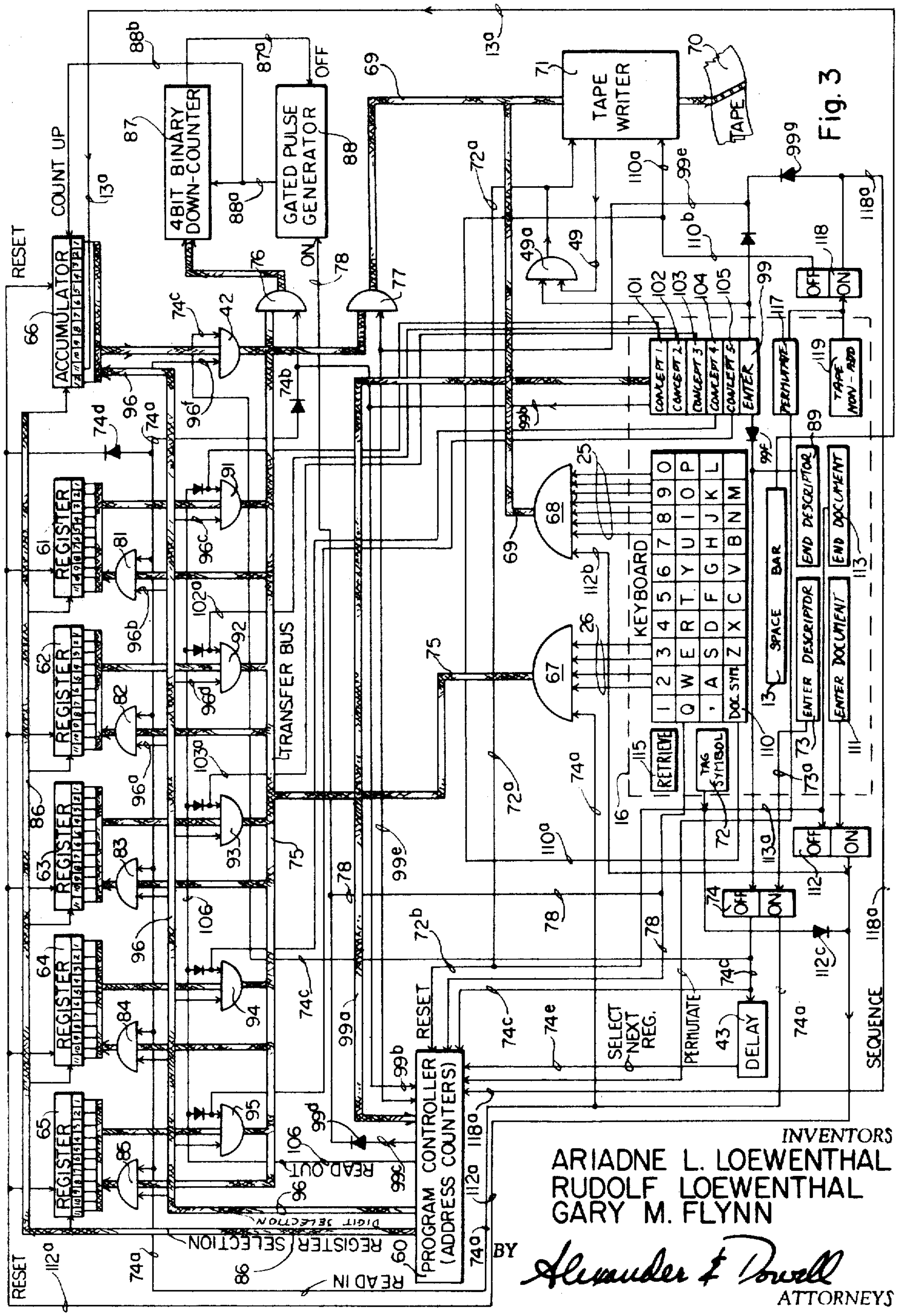
FIG. 3 is a block diagram showing in greater detail the data-entry mode of the system.

Referring now to FIG. 1, FIG. 1 shows a view of a desk-top embodiment 14 of the system including a cabinet 15 supporting a keyboard 16 whose details are shown in FIGS. 3 and 4, and further including a system for driving a storage tape 70, which is included to represent any one of a number of different types of storage means, such as magnetic tape, punched paper tape, etc. The system includes a cable connector 17 by which the desk-top unit 15 may be plugged into a large computer to make use of its storage and sorting capabilities to supplement the capability of the tape 70, or substitute for it. The unit 14 further includes a print out system generally referred to by the reference character 128 which prints upon a paper sheet 18 the bibliographic data which is stored on the tape 70 propinquitiously with one or more document tag numbers which are uniquely and arbitrarily assigned by the operator of the system to each of the documents stored, the manner of such assignment being explained more fully in connection with FIG. 3.

The general operation of the system is such that during the storage mode, the operator types in one or more descriptor terms or phrases, and then types in the bibliographic data. The system automatically encodes the descriptor terms into fixed format tag numbers, having twelve digits in the present illustrative embodiment, these tag numbers being different for all different words and phrases. Conversely, in the retrieval mode the operator again types in descriptor words or phrases, and the system then scans the recorded tape 70 and retrieves from it all documents stored propinquitiously with the tag number being scanned. Each time the system locates a document tagged with the encoded descriptor term entered at the keyboard, the bibliographic data associated therewith is retrieved and typed out on the paper 18, which ultimately displays all documents stored on the tape 70 together with that tag number.

The unit 14 is also provided with another cable connector 19 by which it can be connected to an external automatic typewriting system for print-out of the retrieved documents, which system could be remotely located. Still another cable connector 20 is provided by which an external input can be made to the machine in substitution for entry of data by way of the keyboard 16. By this means, the system can be made to accept data from external tape units as well as from various types of punch card reading machines.

Figure 5A:
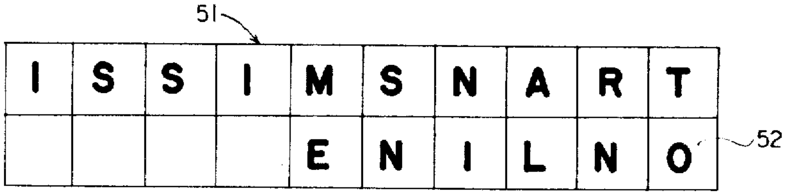
FIG. 5 is a diagram illustrating the encoding of a tag number by entering the descriptor phrase TRANSMISSION LINE into the system.
Figures 5, 5B:
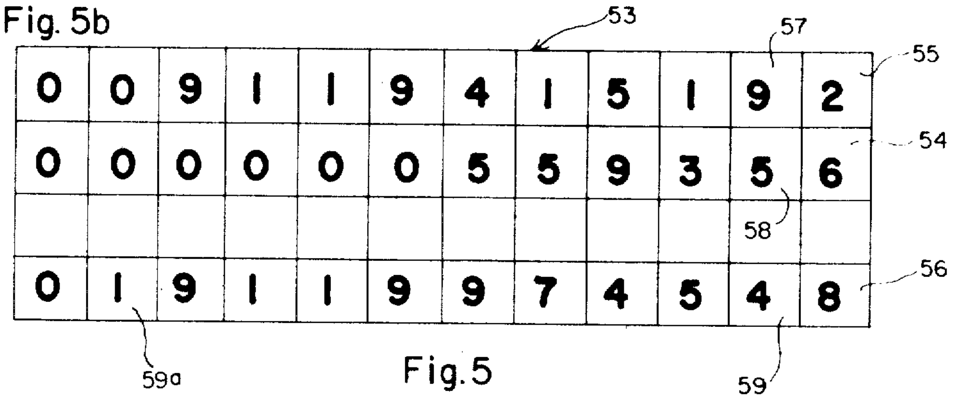
Figure 2:
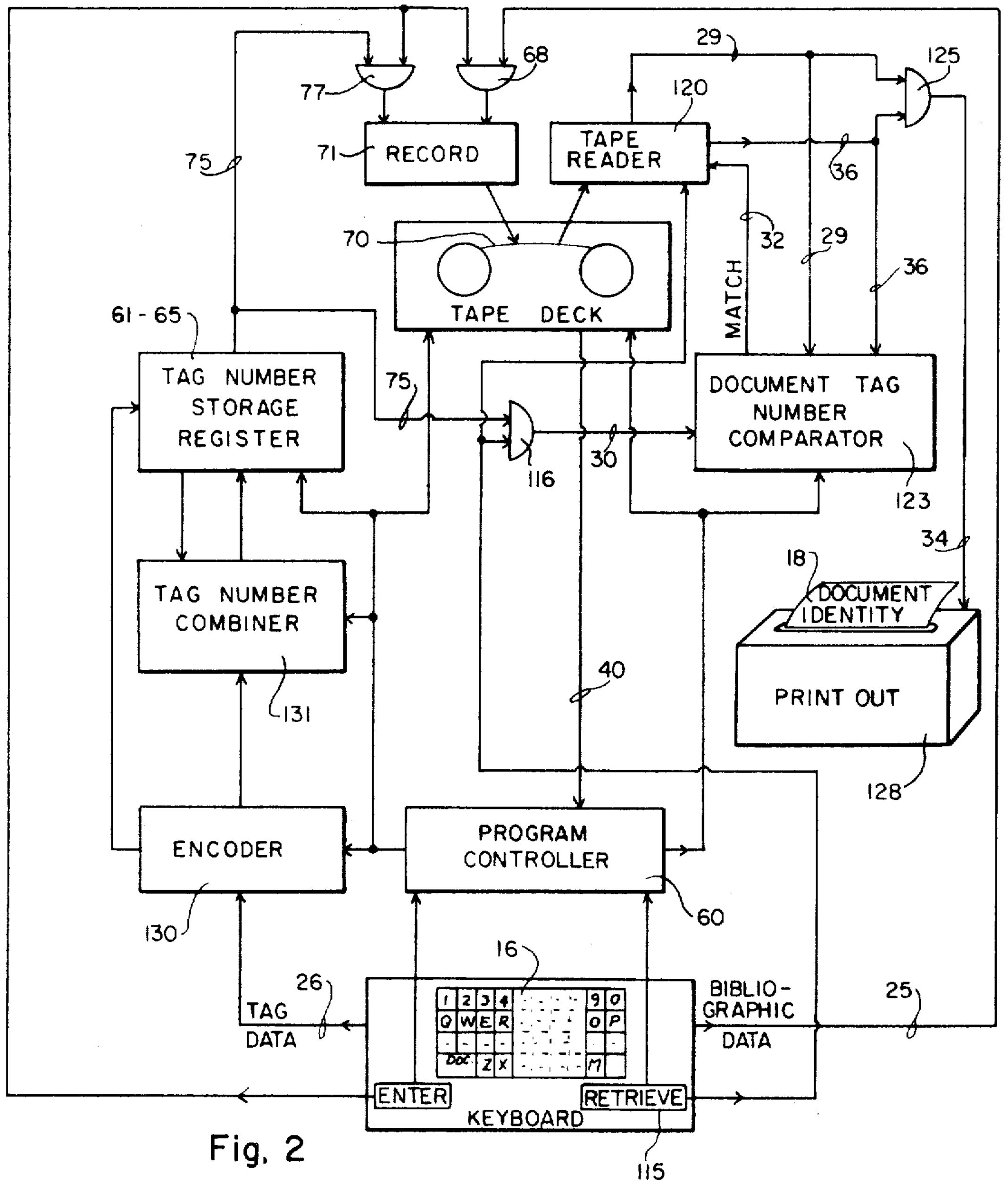
FIG. 2 is a block diagram showing the flow of data in the system as a whole.

FIG. 2 illustrates in a diagrammatic way the flow of data into the system and the retrieval of data therefrom. The data which flows in the system can be divided into two broad categories, namely data which is merely transformed into binary format and recorded directly on the tape 70, this data comprising the bibliographic data flowing from the keyboard 16 via the wire 25 in FIG. 2, and this data including title of the document, author, publisher, accession number or patent number, etc. The other broad type of data relates to descriptor term entries flowing from the keyboard 16 on the wires 26, and this data comprising in all cases nothing but the digits 1 through 9 representing the 26 letters of the alphabet as transposed according to the above-mentioned assignment table. These input words and phrases are delivered as a sequence of single-digit numerals in four-bit binary format, and this sequence of numerals is then converted by the encoder 130, FIG. 3, of the system into a fixed format multiple digit number whose record length is constant despite the varying record lengths of the input descriptor words and phrases. A plurality of different descriptor terms (words and phrases) can be inserted into the keyboard to identify any particular document, and therefore a plurality of storage registers 61–65 are provided to separately store the various fixed format tag numbers which are encoded to represent these different descriptor terms. Moreover, these tag numbers can be combined by simple arithmetic addition of two tag numbers to produce a third unique tag number representing the combination of the individual simple descriptor terms whose tag numbers were added to form the new tag number. FIG. 5, to be described hereinafter, shows how a unique ten-digit tag number is formed to represent the descriptor phrase TRANSMISSION LINE. Since such a number when made by encoding of a lengthy phrase, or when added to another descriptor tag number, could easily exceed ten digits, all tag numbers are padded out to a total of twelve digits by adding on the left side a series of zeros necessary to fill out the remaining digits to twelve. It is this twelve-digit tag number which is then delivered on the transfer bus 75 to one of several possible destinations. The transfer bus actually comprises 48 wires, providing four binary bits for each of the twelve digits. The program controller 60 controls the reading out of the registers 61–65 one at a time to the bus, and the tag numbers so delivered to the bus can then be rooted to one of several different destinations.

During the storage mode the tag numbers are delivered via the gate 77 to the recording apparatus 71 which can either magnetically record or can punch a paper tape 70. When the operator of the system has entered all of the tag numbers for a particular document, the system then disables the gate 77 and enables the gate 68, at which time the operator enters via the keyboard the bibliographic data representing that document, which data passes to the record apparatus 71 via the wire 25.

When that document is completed, the operator starts over again by entering a new set of descriptor terms to be encoded into tag numbers representing the next document to be stored, and so on.

During the retrieval mode of operation of the system, the operator selects one or more descriptor terms which he feels will represent documents whose identities are stored in the system, and he then enters these descriptor terms one at a time into the system for processing by the encoder 130, described in detail in connection with FIG. 3, and for storage in the registers 61–65. When he has entered the one or more descriptors with which he wishes to retrieve document identities, the system then enables the gate 116 and the program controller 60 to read the stored tag numbers one at a time to the tag number comparator, at the same time enabling the tape reader 120 to read back the descriptor tag numbers recorded on the tape 70 and identifying the various documents associated therewith, these tag numbers being read back on the wire 29. The comparator 123 thus receives a tag number which the operator has just typed into the system via wires 30 and compares this tag number with the tag numbers being read from the tape via wires 29, and whenever an exact match occurs an output appears on wire 32, which slows the tape reader sufficiently to permit it to read out the bibliographic data associated with the matched tag number through a gate 125 which it has just enabled via wire 36, the read-out also being delivered through wires 34 into the document print-out device 128. When the read-out of the data from the reader 120 is completed, the reader again blocks the gate 125 by removing the enabling signal from the wire 36, and the "match" signal disappears from the wire 32 thus permitting the tape reader to return again to high speed scanning of the stored tag numbers. The process is repeated whenever it finds another exact match from the tag numbers being supplied from one of the registers 61–65 to the tag number comparator 123. Eventually, when the tape has been fully scanned, a signal to this effect is delivered on the wire 40 to the program controller, thereby causing it to select the tag number stored in the next register and commence comparison of this tag number with all of the tag numbers previously stored on the tape 70. If only one tag number was stored, the process is completed and the operator must commence again by entering a new descriptor term into the system to be scanned.

ENTERING DATA

Referring now to FIG. 3, this figure shows the portion of the system which is concerned with the entering of data of two different categories, first, descriptor tags, and second subject matter and document identification such as title, author, publisher, accession number, patent number, etc. This drawing shows the keyboard 16 which is of a type resembling the keyboard of a typewriter, but modified to provide the necessary functions of the present system. The keyboard includes a top row of numbers 1 through 9 and 0, three more rows of letters and a space bar 13 arranged as on a typewriter, and a plurality of specialized keys which will be discussed hereinafter, all these keys being contained within a dashed box in FIG. 3.

The keyboard actuates a Program Controller 60 including a series of address counters whose functions will become apparent during the following sequential discussion of FIG. 3, but whose specific details form no part of the present invention. The illustrated system further includes a series of five random-access registers 61, 62, 63, 64, and 65 each of which includes eleven digits, each having four binary bits, and the system further includes an accumulator 66 comprising a register including twelve digits of four binary bits each, having a carry capacity from one digit to the next. The function of the program controller is to select appropriate digits within the accumulator and the various registers in an orderly sequential manner as will be described.

In the working model of the present system, under each key of the keyboard are a number of switch contacts which are closed by depressing the key, and these switch contacts are wired in such a manner as to convert the alphanumeric symbol selected by depressing a particular key directly into binary form, in fact into two binary forms. One of the binary outputs is a four-bit signal delivered to a gate 67, and the other binary output is in the form of seven bits delivered to a gate 68. This type of mechanical-switch keyboard can be replaced by a simpler keyboard combined with suitable diode logic for generating the required binary codes upon depression of a key.

The reason for having two different binary outputs from the keyboard can be explained in terms of the two different categories of information to be entered into the system via the keyboard. The first category includes descriptor terms to be encoded into a unique numeric tag of fixed format in which all of the letters of the alphabet are converted into numbers from 1 to 9 according to the table appearing above in the specification. Since only nine different numbers are used to represent the entire alphabet, four binary bits are more than adequate to represent these numbers and to apply them to the gate 67 during encoding of these descriptor terms, wherein punctuation and capitalization are ignored and wherein any numerals to be entered will be written out as words before entry into the keyboard 16. The second category of information to be entered via the keyboard represents the identity of a document to be stored, and is referred to herein as bibliographic information including not only alphabetic symbols and Arabic numbers, but also including spacings and some punctuation. Seven binary bits are entirely adequate to cover this type of input information which is fed to the gate 68 from the keyboard. In general, the gate 67 is enabled only during encoding of descriptor terms and entry thereof into the system, and the gate 68 is enabled only during entry of the bibliographic information into the system.

The portion of the system shown in the block diagram of FIG. 3 performs three major functions. First, the entry of descriptor terms including the conversion of those terms into twelve-digit numbers of fixed format which uniquely and arbitrarily represent a descriptor word or phrase; Second, the combining of plural on of these tag numbers to represent compound concepts expressed in terms of a new unique twelve-digit tag number formed by adding together two or more of the simple concept tag numbers using the accumulator 66 for this purpose, functions one and two including the entry of selected tag numbers into a storage device, which in the present embodiment is represented by a paper tape 70 punched by a standard puncher 71 according to an 8:4:2:1 binary format which is commonly used as input and output for computers, Teletypes, Flexowriters, etc. The third major function performed by the system shown in FIG. 3 includes the entry of bibliographic information directly into the keyboard and the conversion thereof into seven binary bits, and the punching of these binary bits onto the tape propinquitiously with the identifying tag numbers. The performance of the above three functions will now be described sequentially as data is entered into the system for storage on the tape 70.

Assume as an example that there is a document relating to antennas which is to be stored in the system, and further assume that three descriptor terms have been selected to describe the subject matter as follows. ANTENNA; TRANSMISSION LINE; and COAXIAL. The purpose of the entry is to enter on the punch tape 70 these three descriptor terms individually and/or in one or more significant combinations, all entries being made in the form of twelve-digit tag numbers encoded by the system. These tag numbers will be entered propinquitiously with the title of the document, the author, and an accession number, for example. The operator of the machine need know nothing at all about coding of any of the words, but simply typewrites them into the machine as follows:

The first step in entering data is to depress the key 72 marked "Tag Symbol," this key entering on the punched tape via wire 72*a* an indication that the following entries are tag numbers for a document, and the key further delivering an output on wire 72*b* to reset the Program Controller 60. The operator then presses the key 73 marked "Enter Descriptor," and an output on the wire 73*a* turns on a bi-stable flipflop 74 which then delivers output to the wire 74*a*, and this output performs several functions as follows. First, it enables the gate 67 so that the entry of letters onto the keyboard 16 will deliver assigned binary bits representing those letters onto the main transfer bus 75, which actually comprises four wires corresponding with the four bits. The transfer bus can be selectively connected by the Program Controller 60 to the various digits in the registers 61, 62, 63, 64, and 65, either to transfer information from the bus 75 into these registers via the gates 81, 82, 83, 84, and 85, or to transfer information out of these registers onto the bus 75 by way of the gates 91, 92, 93, 94, or 95, depending on which of the gates is enabled at any particular moment. Almost all information which is transferred in the system relating to descriptor tags goes by way of the bus 75, whereas information relating to bibliographic data is transferred by way of the bus 69 as will be hereinafter explained. Each of the gates referred to above actually comprises several separate gates to accommodate the several binary bits representing each digit, these gates being lumped together in the present drawing for the sake of simplicity of illustration. The registers 61, 62, 63, 64, and 65 are used to store either tag numbers, whereas the accumulator is used in the encoding and combining of the tag numbers.

Recapitulating, the operator of the machine has pressed the Tag Symbol key 72 to reset the programming system, and has depressed the "Enter Descriptor" key 73 to turn on the flipflop 74 and thus enable the gate 67 through wire 74*a*. A further output on wire 74*a* also enables one terminal each of the And gates 81, 82, 83, 84, and 85 through which information is entered into selected registers from the transfer bus 75. The first descriptor term to be entered is the word ANTENNA containing seven letters. The operator depresses the A on the keyboard 16 which according to the letter assignment table set forth above in this specification is represented by the assigned numeral 1, and a four-bit output from the keyboard through gate 67 is therefore represented by the binary number 0001 which is delivered on the bus 75 to all of the gates 81, 82, 83, 84, and 85, as well as to the gate 76 and the gate 77. The depressing of the key A, or any other key on the keyboard 16, delivers an output on wire 78 indicating that a new alphanumeric digit is being transmitted from the keyboard, and the presence of this signal on wire 78 sets the program controller address counters 60 into motion. Signals appear on the two bundles of control wires 86 and 96, the group of wires 86 selecting one of the registers 61, 62, 63, 64, or 65. In this case, since no entries have been made in the machine until now, the first register 61 will be selected and the bundle of wires 96 will select the first one of the digits in the first register 61 and also the first digit in the accumulator 66. Therefore, the binary signal 0001 representing the letter "A" will be entered from the bus 75 into the #1 digit of the register 61. As pointed out above, the turning on of the flipflop 74 not only enables the gate 67 through the wire 74*a*, but the signal also passes through a diode 74*b* and enables the gate 76 so that the four-bit binary information 0001 on the bus 75 passes through the gate 76 and presets a four-bit binary down-counter 87. Moreover, the depression of the key A on the keyboard 16 energizes the wire 78 which turns on a gated pulse generator 88 and starts a flow of clock pulses to count the binary counter 87 down. Since the number preset into the binary counter 87 corresponds with the number 1, the first output pulse on wire 88*a* counts the counter 87 back to 0000, resulting in an output on wire 87*a* which turns off the gated pulse generator 88. The result of this action was that a single pulse from wire 88*a* was delivered on wire 88*b* to the first digit of the accumulator 66, thereby storing the number 1. Each digit of the accumulator 66 comprises a four-bit binary counter, and therefore the count obtained in the first-digit counter is a count 0001. One reason for having the accumulator in addition to having each register is that if more than ten letters appear in the alphabetic descriptor term then a second row of numbers will be entered in the matrix shown in FIG. 5, by which longer phrases or descriptor terms are entered into the system as will be described in connection with the next descriptor term, namely TRANSMISSION LINE. The accumulator therefore serves to add up the various digits of lengthy descriptor terms. At this point, the register 61 and the accumulator 66 both contain a binary one in the first digit.

The operator of the machine then depresses the key representing the next letter in the term ANTENNA, namely the letter "N" which has been assigned the numeral 5 according to the table set forth above. The depressing of the "N" key delivers a new signal on the wire 78 and now advances the address counters in Controller 60 to select the second digit via the bundle of wires 96, but no change is made in the bundle 86 and therefore it is only the register 61 and the accumulator 66 which are still energized. The assigned numeral 5 representing the letter "N" places the binary code 0101 on the bus 75 through the gate 67, and the appearance of this second number enters in the second digit of register 61 a binary 5 via the gate 81. The binary 5 is also applied through the gate 76 to preset the down-counter 87, and the new output appearing on the wire 78 again turns on the pulse generator 88 and starts it counting the counter 87 downwardly. It takes five pulses to count it down, and therefore after five pulses an output appears on wire 87*a* to turn off the gated pulse generator 88 these five pulses also being delivered on the wire 88*b* to the second digit of the accumulator 66 which records a binary five 0101. The operator then depresses the next key representing the letter "T" which has been assigned the numeral 2, and this results in another new signal on wire 78 which advances the address counters in the Controller 60 to select the third digits in the register 61 and the accumulator 66. Thereafter, a binary two is entered in the third position of the accumulator 66 and the register 61.

When all of the letters of the word ANTENNA have been entered on the keyboard, binary numbers will be stored in the first seven digits of both the register 61 and the accumulator 66. Since the entire descriptor term ANTENNA has now been entered, the operator depresses the key 89 marked "End Descriptor," and thereby turns off the flip-flop 74 and delivering an output on the wire 74*c* which operates through a delay circuit 43 (explained hereinafter), and via the wire 74*e* actuates the Program Control 60 to select via the wires 86 the next register in the series of registers, namely register 62, and to leave the register 61 containing the binary code for the word ANTENNA in its first seven digits.

Now the operator is ready to enter the second descriptor term comprising the phrase TRANSMISSION LINE. and he therefore initiates a new entry of a descriptor term be again depressing the bar 73 to return the flipflop 74 to "on" condition, thereby again enabling the gate 76, and the gates 81–85 at one of their inputs, the other input of the gate 82 being energized from the cable 96 via the wire 96*a*, whereas the gate 81 now lapses into blocked condition because the wire 96*b* is no longer energized by the Controller 60. The new output on wire 74*a* from the flipflop 74 also resets the accumulator 66 via the diode 74*d*. The operator now depresses the key "T" to enter the first letter in the descriptor phrase TRANSMISSION LINE, and in a manner similar to the entry of the first letter of the previous descriptor term, this entry is made in the first digit of the register 62, the entry corresponding with a binary two, namely 0010. This binary two is also used to preset the down-counter 87 through gate 76, enabled via the diode 74*b*, and two pulses are required to count the down counter 87 back to zero and to store a binary two in the first digit of the accumulator 66. The entries which will be made in the accumulator 66 are illustrated in FIG. 5 which shows in FIG. 5*a* the arrangement in a matrix 51 of the letters in the descriptor term TRANSMISSION LINE, and in FIG. 5*b* the arrangement in the matrix 53 of the numbers assigned to represent these letters. Assuming that ten letter of a desciptor term comprise each row of the matrix 51 shown in FIG. 5*a* by which the descriptor terms are converted into unique tag numbers, the next nine letters of the term TRANSMISSION LINE through the second occurrence of the letter I will be entered into the first ten digits of the register 62 and of the accumulator 66. However, the eleventh letter of the phrase, namely the letter "O" will start the next line, 52 in FIG. 5*a*, because the address counters in the Controller 60 in this mode of operation count only to ten and then start over counting again, however without advancing beyond the selection of the register 62 which advances only when the bar 89 is depressed to indicate the end of a descriptor term. Therefore, when the letter "O" is depressed on the keyboard by the operator, a binary six will be entered into the first digit of the register 62 as shown at 54 in FIG. 5*b*, and will also be passed through the gate 76 to preset the down counter 87. Six pulses will be counted into the counter in a manner described above to count it down to zero, at which time the pulses will cease to flow through the wire 88*b* and the first digit of the accumulator 66 will have received six more pulses to add to the two pulses counted into this same digit by the introduction of the first letter T in the descriptor phrase. Thus, the first digit of the accumulator 66 will contain a binary eight because it has now added the first entries in the digits 54 and 55 in each of the two rows of FIG. 5*b* to obtain a total of 8 as shown at 56. The second digit in the accumulator 66 corresponded with the letter R and was therefore a binary nine at 57 in FIG. 5*b*. When the operator depresses the "N" key on the keyboard to introduce the last letter in TRANSMISSION, he will add five more pulses to the second digit at 58 whereby 14 pulses will have been put into the second digit. However, the counters in the accumulator 66 are all gated to start over at the count of 10 and to "carry" one pulse to the next higher digit in the accumulator 66. The third digit already contained a binary "one" from the "A" which was previously inserted therein and has been further counted up to two by the "carry" process.

The whole word TRANSMISSION having been inserted, the operator depresses the space bar 13 before entering the second word LINE, and thereby initiates a step designed to further enhance the uniqueness of the tag number encoded by the system to represent this descriptor term, namely the insertion in the next-to-the-last digit of the accumulator 66 of counts which are based upon the number of words in a descriptor phrase. There are several ways to accomplish this further enhancement, one being to insert a count via the wire 13*a* into one of the most-significant digits each time the space bar 13 is depressed as shown in FIG. 3. In this way, in the present example shown in FIG. 5*b*, a count of 1 will be added in the eleventh digit 59*a*. Another way of enhancement is to multiply the accumulated tag number by the number of words in the descriptor term, in this case by two. This approach is more complex and involves feeding the tag number from whichever of the registers 61–65 in which it is stored into the accumulator 66 plural times, one time for each word in the descriptor phrase until the accumulator eventually contains the "multiplied" number, acquired by successive additions of the unmultiplied number. This latter alternative is not illustrated in the present drawings.

At any rate, having entered the space on the bar 13, at this point the operator inserts the letter "L" represented by a binary three, thereby raising the count in the third digit, second row of FIG. 5*b*, to five. Next, the operator enters the "I" in the fourth digit of the accumulator, thereby entering a binary nine in addition to the binary five which was previously stored in that digit to represent the letter N. Thus, the count in the fourth digit becomes 14, thereby carrying one pulse to the fifth digit, and entering a binary four in the fourth digit. The fifth digit already had received a binary one representing the letter "S," and therefore the "carry" pulse raised the total count in the fifth digit to two. The insertion of a binary five representing the letter "N" in LINE thereby raised the count in the fifth digit to seven. In the sixth digit, a binary four was entered representing the letter "M," and when the operator depressed the key "E" to enter the last letter of the descriptor term, he entered a binary five, thereby raising the count to nine. Nothing further is to be added, in the seventh, eighth, ninth, or tenth digits which respectively contain the letters "ISSI" represented by the number 9119, and therefore the encoded fixed-format twelve-digit number uniquely representing the descriptor phrase TRANSMISSION LINE, and including a count in the eleventh digit representing the space between descriptor words, is 019119974548, and this number is now contained in the twelve digits of the accumulator. Although only eleven of the digits of the accumulator were used in this example and the other digit was padded with a zero, all twelve of the digits are likely to be used where descriptor terms of greater length are employed, or where two shorter descriptor terms are added together to obtain a compound descriptor term which can easily use all twelve digits. The compounding of the descriptor terms will be described hereinafter more fully.

At this point, the register 61 contains the encoded word ANTENNA, the accumulator 66 contains the encoded words TRANSMISSION LINE, and the register 62 which is activated at the moment contains a plurality of numbers which are of no particular interest to us at the moment. It is now desirable to set into the register 62 the tag number representing TRANSMISSION LINE, by taking it digit by digit from the accumulator 66.

The manner in which the accumulator 66 has its digits set into the register 62 for storage is as follows. When the operator depresses the "End Descriptor" bar 89 and shuts off the flipflop 74, there is a pause before the controller 60 moves on to select the next register 63, the pause being introduced by the delay circuit 43, and in the meanwhile, the output on wire 74*c* recycles the address counters through another series of digits, this time twelve, and also enables the gate 42 through wire 74*c*. As the address counters sweep through the digits, the accumulator 66 reads its tag numbers into the register 62, which merely ignores the twelfth digit, and when it has finished and the delay 43 ends, the Program Controller 60 moves on to select the next register 63 and await the next descriptor term which the operator will enter, if any. The accumulator is always read into a register when the flipflop 74 goes "off," although this process was not described in connection with the entry of ANTENNA because the register 61 already contained the correct tag number and the process was mere duplication.

At this point the register 61 contains the tag number representing the descriptor term ANTENNA and the register 62 contains the tag number representing the description phrase TRANSMISSION LINE. In like manner, the operator enters the third descriptor term COAXIAL for encoding and storage in the register 63. Now, all three descriptor terms have been encoded and their tag numbers are contained in registers 61 through 63 for temporary storage, and only one function remains for the operator to decide upon, before going on to enter the bibliographic data identifying the document.

The operator must decide whether or not to combine any of the descriptor concepts to form a compound term or terms. Although the block diagram of FIG. 3 shows only five registers, it is to be understood that a practical machine would probably include more registers to accommodate a greater number of descriptor terms. For purposes of the present illustration, however, only a single combining of the terms will be described as follows: Suppose that the operator wishes to combine the second and third terms into a compound concept, namely COAXIAL TRANSMISSION LINE. The tag number for the word COAXIAL is contained in register 63 whose tag number can be recalled by pressing the key 103 labeled "Concept #3," and the phrase TRANSMISSION LINE has had its tag number stored in register 62, which can be recalled by pressing the "Concept #2" key 102. The other three keys 104, 105 and 101 likewise can be used to recall the contents of their respective registers 64, 65, and 61 when desired. As stated above, a compound concept tag number is formed merely by adding together two simple concept tag numbers in the normal manner in which these numbers would be added by a common adding machine. Therefore, it really does not matter which order the concept keys 102 and 103 are pressed in, since the resulting summation number will be the same in either case. Assume therefore that when the operator entered the last letter "L" in the last descriptor term COAXIAL, that he then pressed the "End Descriptor" bar 89 returning the flipflop 74 to off condition.

To accomplish the combining of concepts #2 and #3, the operator merely presses the "Enter Descriptor" bar 73, thus turning on the flipflop 74 and resetting the accumulator 66 through the wire 74_a_ and diode 74_d_. He then presses the concept #2 key 102, and the bundle of wires 99_a_ selects the second register 62 within the program controller 60, and an output on the wire 99_b_ causes the address counters to run through one sequence of digits on all the registers, which really only causes the selected register 62 to be sequenced since only its output gate 92 is enabled by wire 102_a_. Moreover, the output on wire 99_b_ also enables the gate 76, and each time a new digit is selected the controller 60 delivers a pulse through the wire 99_c_ and diode 99_d_ to start the gated pulse generator 88 counting. Therefore, the register 62 begins reading out its digits one at a time through the gate 92, and these digits are delivered from the transfer bus 75, through the gate 76, and are used to preset the down counter 87. Therefore, in its first digit it accumulates the number of pulses required to count the down-counter 87 back to zero as described several times supra, and therefore the first stage of the accumulator acquires the same count as was in the first stage of the register 62. The program control 60 then steps to the second digit, and the register 62 through the gate 92 applies the second-digit binary-code to the transfer bus, and this digit then presets the binary down-counter 87 through the gate 76. Then program control 60 then delivers a second signal on the wire 99_c_ to turn on the gate pulse generator 88, and another signal on the wires 96 to advance the accumulator to its second digit. The accumulator is then counted upwardly by the pulses from the generator 88 until the second digit has been read from the register 62 into the second digit of the accumulator. This process continues until the entire content of the register 62 has been read into the accumulator 66, at which time the system pauses for the next command. This entire process would require a few milliseconds, and then the operator depresses the concept #3 key 103, thereby disabling the gate 92 and enabling the gate 93 through the wire 103_a_. The bundle of wires 99_a_ selects the register 63 and the wire 99_b_ causes the program control to run through one sequence of digits again. This time, the accumulator 66 will not have been reset to zero through the wire 74_a_ and diode 74_d_ since the flipflop 74 was not again actuated. Now, the content of register 63 must be added to the content of register 62 which has just been transferred to the accumulator 66. The program controller 60 now proceeds to select the first digit in register 63 and read it out through gate 93 onto the transfer bus 75 to preset the down counter 87 through the gate 76. The wire 99_c_ turns the gating generator on and advances the accumulator digits step by step with the digits of register 63 until all of the digits within the register 63 are read into the accumulator, one at a time, and the accumulator is counted upwardly in each digit from the count originally entered in that digit from register 62 including the carrying of overflow from digit to digit whenever the count exceeds nine. In this way the accumulator acquires a total representing the summation of the tag numbers for the concept TRANSMISSION LINE and for the concept COAXIAL.

Since the compound tag number in the accumulator requires no further processing, it is not read from the accumulator back into a storage register, but rather it is read directly into the tape puncher 71 through the gates 42 and 77. This is accomplished by pressing the "Enter" key 99 which turns off the flipflop 74 via the diode 99_f_, enabling the gate 42 via wire 74_c_ and also cycles the Controller 60 through twelve digits by energizing wire 99_e_. This wire also enables the gate 77. The system thus connects the accumulator digits to the corresponding digits of the tape writer 71 to enter thereon the compound descriptor term tag number. When the writer 71 is finished it stops the Controller 60 by an output on wire 49 through gate 49_a_ which causes the system to stop pending further instructions. The operator can either enter another compound descriptor number on the tape 70 as just outlined, or he can enter the simple tag numbers still contained in the registers 61, 62, and 63. He also may be given the option of entering all possible permutations of the tag numbers contained in the registers 61 through 65 by depressing the "Permutate" key 117 which initiates an automatic version of the above-described compounding process without further intervention by the operator and according to a pre-arranged program within the controller 60. More than two simple descriptor terms can be combined to form a compound term if desired.

Assuming that the operator now wishes to read out the simple tag numbers as they appear in the respective registers 61, 62 and 63 to the tape writer 71, this is accomplished by depressing the "Tape Non-Add" key 119 which delivers an output to turn "on" flipflop 118 causing an output to appear on wire 118_a_ which actuates the Program Controller 60 to run through all five registers in sequence. Thus, an output appears from the Program Controller 60 upon the wire 106 which enables the right-hand input to all of the gates 91, 92, 93, 94, and 95 through their respective coupling diodes. The Program Controller then counts its address counters through a complete sequence of digits five times in a row, each time enabling the left-hand input of a different one of the gates 91 through 95 through the bundle of wires 96. First, the wire 96_c_ is enabled, and all digits of the register 61 are read in sequence onto the transfer bus 75 to the gate 77 which has been enabled through the diode 99_g_, the gate 76 not being enabled at the present time and the gate 42 being blocked during this sequence of the Controller 60. The outputs of the digits from register 61 therefore appear on the bus 69 going to the tape writer 71, and a single row of binary entries is made across the tape beneath the previously entered rows of descriptors beneath the tag symbol which was entered on the tape at the very beginning of this overall sequence of operation when the operator first pressed the tag symbol key 72. When the register 61 has had its content printed on the tape, the address counters 60 will move on to the second gate 92 by energizing the wire 96_d_. The address counters then run through another sequence of digits for the next register 62, and so on. Ultimately, in this way, the content of all the registers 61 through 65 will have been entered in rows of the tape and then the operator will have completed the encoding and entry of all tag numbers.

When this occurs the operator will depress the document symbol key 110 which will furnish an output on the wire 110_a_ to the tape writer 71 to enter on the tape a document symbol and also to turn off the flipflop 118 via wire 110_b_. The operator will then press the enter document bar 111 to change the flipflop 112 to "on" position. This entry will reset the accumulator 66 and all of the registers 61 through 65 via the wire 112_a_, and a continued output on the wire 112_b_ will enable the gate 68 to pass subsequent seven-bit binary outputs from the keys of the keyboard 16 to the bus 69 and thence to the tape writer 71. The operator then proceeds to type in whatever bibliographical information is to be entered for identification of the document associated with the previously entered tag numbers. It will be noted that the keyboard contains at least some punctuation and a space bar key so that that bibliographic data can be typed onto the tape in clear language, although in seven-bit binary format. Eventually, when the operator has typed in the document title, author, publisher, accession number, and/or patent number, etc., the entry has been completed and the operator then depresses the "End Document" bar 113 to return the flipflop 112 to "off" condition, the depressing of the bar 113 delivering an output on wire 113_a_ to the Program Controller 60 which is then completely reset to an off condition. At this point, the accumulator, all registers, the address counters and program controllers are completely reset to the initial condition at which discussion was commenced under this section of the present disclosure, and all is in readiness to begin entering the descriptors for the next document, the process being initiated by depressing the tag symbol key 72, as discussed above.

The above example illustrates the entry of numbers from right to left in the matrix of FIG. 5 using random access registers 61–65. However, if shift registers were used, each number entered would be shifted to the left by the next entry so that the succession of tag numbers would be the reverse of that shown in FIG. 5 although the resulting tag number would have about the same degree of uniqueness, whether it be arrived at by justifying from the right or from the left.

DATA RETRIEVAL

The diagram of FIG. 4 repeats enough of the showings of FIG. 3 to orient the retrieval mode with respect to the data entering process, the two of which modes include in common a great deal of the circuitry of FIG. 3. The retrieval mode of operation uses the same encoding steps to produce similar document tag numbers, which numbers are then compared with the various tag numbers previously recorded on the storage tape. It will be recalled that an exact match of interrogating tag numbers with previously taped tag numbers must be had in order to initiate readout of the bibliographic data identified by the matched tag number.

The operator of the system in order to retrieve a document interrogates the system in the retrieval mode by entering a descriptor term in natural language words into the keyboard 16 to be encoded into a tag number. For instance, it will be recalled from the last section that the illustrative subject matter was stored under three descriptor terms, two of which were combined to form a compound term. The terms were, ANTENNA, TRANSMISSION LINE, and COAXIAL, and the compound term was COAXIAL TRANSMISSION LINE. If the information stored on the tape involves many subjects other than antennas and transmission lines, then it would be desirable to interrogate the system to retrieve documents relating to antennas primarily, and to antennas having coaxial transmission lines in particular. Thus, the operator may wish to enter the descriptor term ANTENNA to recall all stored documents relating to antennas. In order to do this, he depresses the tag symbol key 72 which, as discussed in connection with FIG. 3, sets the Program Controller 60 in operation. Then he depresses the "Enter Descriptor" bar 73 which causes the address counter to select the first register 61. Next, he enters the word ANTENNA on the keyboard 16 and finally depresses the "End Descriptor" bar 89. At this point, the system will have converted the word ANTENNA into a unique tag number and will have stored it in register 61.

When he stored the information according to FIG. 3, the operator pressed the "Enter" key 99 to enable the gate 77 to enter the tag number from the register 61 onto the tape 70 by way of the puncher 71. However, the operator is now interested in a retrival mode, and he therefore depresses the "Retrieve" key 115, thereby sending out a signal on wire 115*a* to start the address counters 60 to count through the digits in the registers in order to put the interrogating tag number information therefrom onto the transfer bus 75, which also leads to a gate 116, as well as to the disable gate 77. The signal on wire 115*a* also turns on the tape reader 120 which feeds the tape at a rapid rate and reads the tag numbers as they go by, delivering the binary outputs representing these tag numbers via a bundle of wires 121 leading to the document tag number comparator circuit 123 which is also receiving via a similar bundle of wires 122 the read-out from register 61 through the gate 116. When coincidence is achieved within the comparator 123, a signal appears on the wire 124 indicating an "exact match" of the tag number representing the descriptor term ANTENNA, as just entered into the system by the operator, with the same tag number previously stored upon the tape 70 in connection with a certain article relating to antennas. The appearance of this exact match on wire 124 momentarily slows the feed of the tape 70, and when the next document symbol recorded on the tape 70 occurs, an output appears on wire 126 which enables the gate 125 and delivers all of the binary information following that document symbol onto the output wires 121, through the gate 125, through the wires 127 and into the print-out mechanism 128, which can either be self-contained in the machine as shown in FIG. 1, or can comprise a separate machine such as a Flexowriter. In any event the retrieved bibliographic data is now printed out on a sheet 18 and the output remains enabled through the wire 126 until the next tag symbol appears, at which time the output disappears from wire 126 and appears on wire 129 to reset the exact match comparator to remove the coincidence condition and start the tape drive running again at a high rate of speed, which will continue until another document is located on the tape having a tag number representing the descriptor term ANTENNA.

If the total number of documents retrieved under the word ANTENNA is too great and the operator of the machine wishes to reduce their number and be more specific, he might then wish to search a combined term, for instance the term COAXIAL combined with TRANSMISSION LINE. The operator then presses the tag symbol key 72 to start the machine running, depresses the "Enter Descriptor" key 73, types in the descriptor term COAXIAL, which will then be converted as shown in FIG. 3 into a tag number which can be stored in one of the registers 61–65. Since these registers have all been reset through the diode 112*c* in FIG. 3 by depressing the tag symbol key 72, the tag number can go into the first register 61 instead of in the third register in which it was stored during entry in FIG. 3. The operator signals the end of the descriptor term COAXIAL by depressing the "End Descriptor" bar 89, and subsequently again depresses the "Enter Descriptor" bar 73, this time typing in the phrase "TRANSMISSION LINE." Since the word COAXIAL is now represented by a tag number stored in the register 61, the encoded tag number for the phrase TRANSMISSION LINE will be entered in the next available register, namely register 62. When entry of TRANSMISSION LINE has been completed in this register, the operator will depress the "End Descriptor" bar 89, and since he wishes to combine these terms, he will press "Concept #1" key 101, and subsequently "Concept #2" key 102, and then the Enter key 99 which will result in the entry into the accumulator 66 of the combined concept term as previously worked out in connection with FIG. 3.

Now the operator has tag numbers in three different registers, register 61 containing the word COAXIAL, register 62 containing the phrase TRANSMISSION LINE and accumulator 66 containing the compound concept term COAXIAL TRANSMISSION LINE. In order to use these concepts, the operator depresses the Retrieve key 115 and the system will scan the documents for the compound concept represented by the number in the accumulator 66. Alternatively, he can depress the retrieve key 115 and the Concept #1 key 101, and the system will scan for documents using the word COAXIAL as a descriptor term. Alternatively, he can depress the "Retrieve" key 115 and the "Concept #2" key 102, and he will retrieve those documents having TRANSMISSION LINE as a tag. Thus, an operator can enter as many concepts as there are registers, and the encoded tag numbers can all be stored at once so that the operator can retrieve using any one of them or any preencoded compound concept under which documents may be stored. Simple additions to the Controller circuitry will enable the operator to read compounded descriptor terms formed in the accumulator 66 back into a storage register 61–66 so that more than one compound term can be contained within the system storage at any one time. The selection of any particular register will result in the delivery of a newly entered tag number for retrieval purposes as determined by the bundle of selection wires 99*a* and 101*a* through 105*a* as shown in FIG. 3. Each time a selection is made, the address counter will sweep through the various digits of the registers by way of the bundle of wires 96. The actual encoding of the tag numbers from the entered descriptor terms is shown in FIG. 3, and only broadly represented by the box labeled "Encoder" 130 in FIG. 4.

Thus it will be seen that the operator in using the system is only responsible for using consistent descriptor terminology, and all of the encoding is accomplished before the terms are entered in the registers 61–65, from which registers they can be used either for storage purposes or retrieval purposes. An automatic permutation of descriptor tag numbers already stored in the registers can be had for retrieval purposes by depressing the Automatic Permutation" key 117, the same as was done for storage purposes as set forth in connection with FIG. 3.

This invention is not to be limited to the exact form shown in the drawings, for obviously changes may be made therein within the scope of the following claims.

What is claimed is:

1. In combination with a data processing system alternatively operative in storage and retrieval modes to identify bibliographic data with arbitrary tags respectively representing the latter, means for encoding unique tags of fixed format in response to the entry during an operative mode of descriptor terms having varying numbers of alphanumeric symbols, comprising:

(a) means for entering into the system a sequence of symbols representing a natural language descriptor term;

(b) means for converting the entered symbols into a sequence of numerals according to a predetermined code assignment;

(c) register means having fixed numbers of digits comprising said fixed format;

(d) program means controlled by said entering means and operative to insert into said register means digit-by-digit said sequence of numerals as the symbols are converted and including means for repeating the insertion of numerals sequentially into the same digits when the number of converted numerals exceeds the number of register digits until all numerals are entered, and said register means including accumulator means for adding the numerals thus entered in the respective digits to obtain a sum comprising an encoded tag number representing the sequentially entered descriptor term; and (e) means in the system for identifying said bibliographic data employing said encoded tag number.

2. In a system as set forth in claim 1, said entering means comprising a keyboard having keys corresponding with entries in the form of symbols and numbers, and said converting means including means responsive to the pressing of keys to deliver predetermined binary numerals representative of said entries.

3. In a system as set forth in claim 2, each digit of said register means having a number of binary bits corresponding with the numbers of bits included in said binary numerals from said converting means.

4. In a system as set forth in claim 2, said keyboard including a key for entering the spaces between words in a descriptor term; and said converting means including means for developing a signal in response to actuation of the space key; and means responsive to said signal for inserting an additional increment into the register means to modify the digital content thereof as a function of the number of words in the descriptor term being entered.

5. In a system as set forth in claim 2, said register means including multiple separate digital registers, and said program means including means sequentially operative for temporarily inserting encoded tag numbers representing different descriptor terms in the separate registers, whereby plural descriptor tag numbers are simultaneously available to identify the same data.

6. In a system as set forth in claim 5, and including a main storage medium for storing data and tag numbers, said program means including means for recalling from said separate registers the tag numbers temporarily contained therein and for delivering the same to said storage medium, and said entering and program means including means for entering appropriate bibliographic data and delivering it for storage propinquitiously with said tag numbers.

7. In a system as set forth in claim 6, said keyboard means including means for indicating to the system whether data being entered is bibliographic or descriptor, and said keyboard and converting means in response to such indication delivering binary numbers representing bibliographic data directly to the storage medium and delivering binary numerals representing descriptor terms to said register means.

8. In a system as set forth in claim 5, said system including a storage medium containing stored data associated with fixed-format tag numbers, said program means including means for recalling from said registers a selected tag number representing a descriptor term; said system including means for scanning the tag numbers stored in said storage medium; comparator means connected to compare said recalled and said scanned tag numbers; and means for reading out from the medium bibliographic data associated with a stored tag number when the comparator means determines that the latter matches said recalled tag number.

9. In a system as set forth in claim 5, said keyboard means including keys for selecting for recall the individual tag numbers contained in said separate registers and each representing a different descriptor term, and said program means and accumulator means including means for adding together tag numbers selected by said keys to produce combined tag numbers representing compounded descriptor terms for further identifying said data.

10. In a system as set forth in claim 9 and including a main storage medium for storing data and tag numbers, said program means including means for recalling from said accumulator means a combined tag number contained therein and for delivering the same to said storage medium, and said entering and program means including means for entering appropriate bibliographic data and delivering it for storage propinquitiously with the latter tag number.

11. In a system as set forth in claim 10, said keyboard means including means for indicating to the system whether data being entered is bibliographic or descriptor, and said keyboard and converting means in response to such indication delivering binary numbers representing bibliographic data directly to the storage medium and deliverying binary numerals representing descriptor terms to said register means.

12. In a system as set forth in claim 9, said system including a storage medium containing stored data tagged with associated fixed-format tag numbers, said program means including means for recalling from said accumulator means a combined tag number representing a compounded descriptor term; said system including means for scanning the tag numbers stored in said storage medium; comparator means connected to compare said recalled and said scanned tag numbers; and means for reading out from the medium bibliographic data associated with a stored tag number when the comparator means determines that the latter matches said recalled tag numbers.

13. In a system as set forth in claim 1, said converted numerals being binary in form and said register and accumulator means having multiple-bit binary storage capacity in each digit, and said system further including a multiple-bit binary down counter, said program means presetting each numeral thereinto each time a symbol is entered into the system; a pulse generator connected when enabled by gating means to deliver pulses to said accumulator and to said down-counter; means responsive to the entry of each symbol to enable the gating means; means responsive to zero-count in the down-counter to disable said gating means; and means responsive to the completion of the entry of a descriptor term to read out the accumulator means into the register means to temporarily retain the resulting tag number.

14. In a system as set forth in claim 13, said register means including multiple separate digital registers, and said program means including means operative for simultaneously storing encoded tag numbers representing different descriptor terms in the separate registers; means including said program means for selectively recalling from said registers at least two tag numbers and reading their digits sequentialy into the corresponding digits of the accumulator means to accumulate a combined tag number representing their sum; and means for coupling the latter number from the accumulator means to said means for identifying said data.

15. A data-processing system for storing and retrieving data identified for address purposes by arbitrary tags representing alphanumeric descriptor terms, comprising:

(a) means for entering said descriptor terms into the system and converting their alphanumeric symbols into a series of preassigned numerals;

(b) means for dividing said series of numerals into groups each including no more than a fixed number of numerals, and for adding together the corresponding digits in all of the groups to obtain a summation number including said fixed number of digits and comprising a tag number; and (c) means operative to identify said data with said tag number for address purposes during processing of the data.

16. Apparatus for converting descriptive words having varying numbers of alphanumeric symbols into a binary code of fixed record length uniquely and arbitrarily identifying the words represented by said symbols, comprising:

(a) means for converting said words into a series of binary multiple-bit digits each representing a symbol;

(b) program means for dividing said series into one or more sequential groups each having the same fixed number of digits occupied in whole or in part by converted symbols;

(c) accumulating register means for adding the multiple-bits occupying corresponding digital positions in the sequential groups together to form a new group of multiple-bit digits comprising said binary code of fixed record length.

17. In apparatus as set forth in claim 16, means for entering into the apparatus an input signal representing each space between words being converted, and means responsive to said signals for inserting additional binary increments into said accumulating register means to modify its digital content as a function of the number of words represented by the resulting binary code.

References Cited

UNITED STATES PATENTS

| | | | |
|---|---|---|---|
| 3,293,619 | 12/1966 | Luhn | 340—172.5 |
| 3,317,899 | 5/1967 | Chien et al. | 340—172.5 |
| 3,358,270 | 12/1967 | Crew et al. | 340—172.5 |

PAUL J. HENON, Primary Examiner

S. R. CHIRLIN, Assistant Examiner